United States Patent [19]

Raslavsky, III

[11] 4,127,896
[45] Nov. 28, 1978

[54] BIDIRECTIONAL INTERFACE UTILIZING READ-ONLY MEMORY, DECODER AND MULTIPLEXER

[75] Inventor: John M. Raslavsky, III, Phoenix, Ariz.

[73] Assignee: Bunker Ramo Corporation, Oak Brook, Ill.

[21] Appl. No.: 823,432

[22] Filed: Aug. 10, 1977

[51] Int. Cl.² .......................... G06F 5/00; G06F 3/00
[52] U.S. Cl. ................................................. 364/200
[58] Field of Search ... 364/200 MS File, 900 MS File; 340/347 DD

[56] References Cited

U.S. PATENT DOCUMENTS

| | | | |
|---|---|---|---|
| 3,846,763 | 11/1974 | Riikonen | 364/200 |
| 3,882,483 | 5/1975 | Burke et al. | 340/347 DD |
| 4,006,463 | 2/1977 | Hanks | 364/200 |
| 4,054,947 | 10/1977 | Shanks et al. | 364/900 |

Primary Examiner—Melvin B. Chapnick
Attorney, Agent, or Firm—F. M. Arbuckle; M. Liss

[57] ABSTRACT

An apparatus matches control code signals and data signals between data processing units which employ different control code formats. The interface is especially suitable for use between a computer bus interface and a controller or between two separate controllers. It employs read-only memory circuits which convert control code signals from the computer bus into discrete controls and commands compatible with the code format of the controller. The read-only memory circuits are programmable to allow looping programs to be implemented.

10 Claims, 1 Drawing Figure

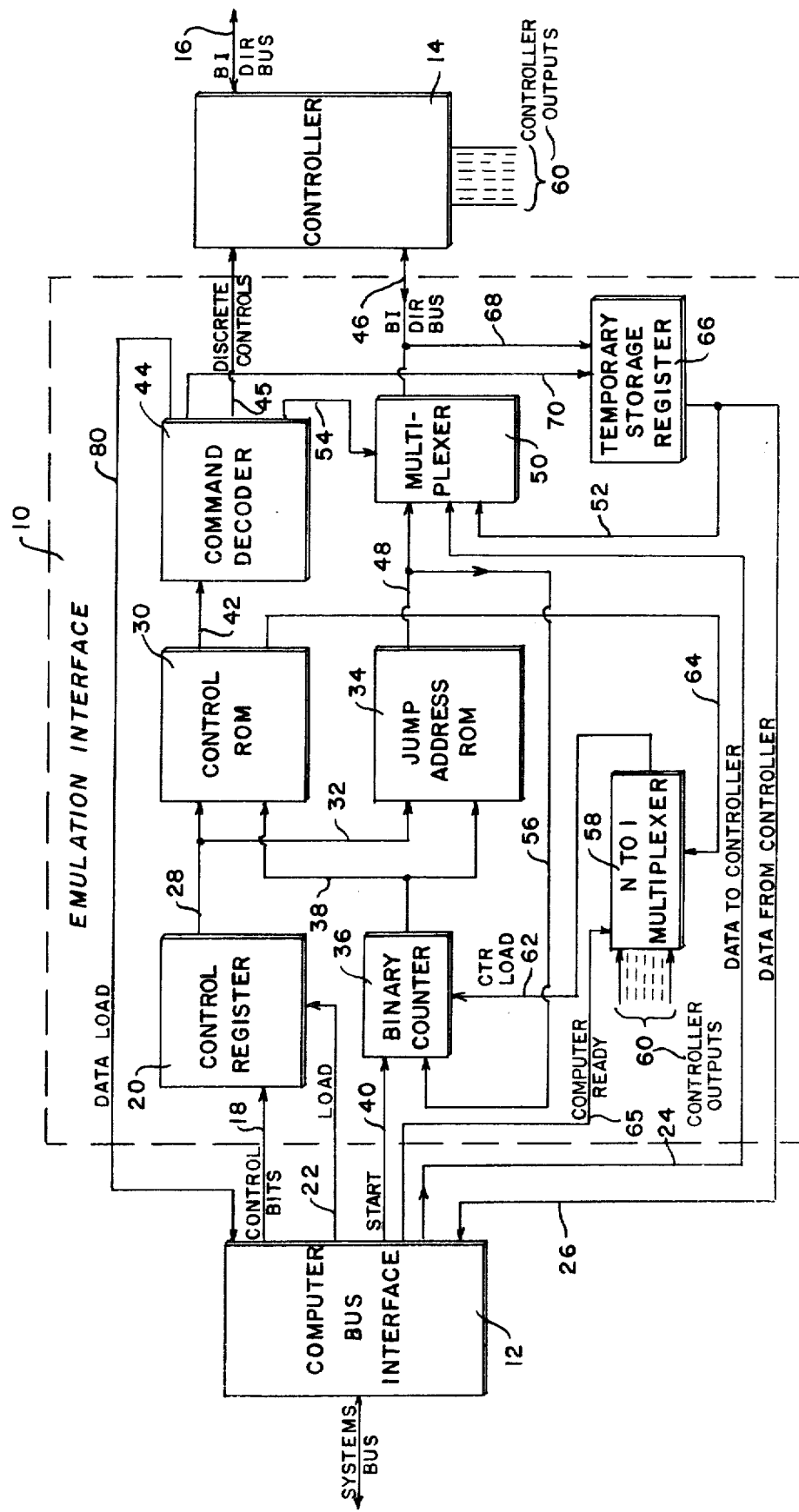

BIDIRECTIONAL INTERFACE UTILIZING READ-ONLY MEMORY, DECODER AND MULTIPLEXER

FIELD OF THE INVENTION

The present invention relates to an interface system for matching control codes and data signals between data processing units which employ different control code formats and, more particularly, to an emulation interface for matching control codes and data signals between a computer bus interface and a controller or between two separate controllers.

BACKGROUND OF THE INVENTION

In the operation of a data processing system, e.g., a microprogrammed bank control and information system, it is often necessary to convert binary coded control signals and data signals from one code to another to transfer the information between data processing units which employ different code formats. Previous systems for achieving the necessary conversion between different code formats have required conversion circuits typically including numerous integrated circuit (IC) chips. Consequently, such circuits have been complex and expensive to fabricate.

The present invention is intended to provide an interface system for use between data processing units employing different code formats which is relatively uncomplicated in structure and inexpensive to manufacture in contrast to prior code conversion systems. An objective of the invention is to provide an emulation interface which advantageously utilizes read-only memory circuits to simplify the code conversion circuit and also permit looping programs to be implemented.

SUMMARY OF THE INVENTION

In accordance with the invention, the interface system comprises a control register for receiving control code signals from a data processing unit, a first read-only memory circuit responsive to the output of the control register and programmed to provide discrete control signals corresponding to the control code signals in the control register, a second read-only memory circuit responsive to the output of the control register and programmed to convert the control signals in the control register into commands in the control code format of the controller, clock means initiated upon loading of the control code signals into the control register for operating the first and second read-only memory circuits, decoder means responsive to the discrete control signals of the first read-only memory circuit for applying discrete controls to the controller to condition its registers to receive commands or data signals, and means operable by the decoder means for selectively applying either commands from the second read-only memory circuit or data signals from the data processing unit to the controller.

Preferably, in the interface system, the second read-only memory circuit is programmed to provide jump address commands to implement looping programs. The system also includes means for sampling the response of the controller to condition the clock means to respond to the jump address commands. In addition, a temporary storage register may be provided which is operable under the control of the decoder means for receiving and storing data signals from the data processing unit for transmission to the controller. In addition, the temporary storage register is operable by the decoder means to receive and store data signals from the controller for transmission to the data processing unit.

A preferred embodiment of the invention provides an emulation interface for matching control code signals and data signals between a computer bus interface and a controller which employ different, fixed control code formats. The interface comprises a control register for receiving control code signals from the computer bus interface, a first read-only memory circuit having its most significant binary inputs responsive to the output of the control register and programmed to provide discrete control signals corresponding to the control signals from the computer bus interface and a second read-only memory circuit having its most significant binary inputs responsive to the output of the control register and programmed to convert the control code signals of the computer bus interface into corresponding commands in the control code format of the controller. The preferred embodiment also includes a binary counter initiated by the computer bus interface upon loading of the control code signals into the control register and having its output coupled to the least significant binary inputs of the first and second read-only memory circuits for indexing the first and second read-only memory circuits. In the preferred embodiment, a command decoder is responsive to the output of the first read-only memory circuit for converting its discrete control signals into the control code format of the controller and applying discrete controls to the controller to condition its registers to receive command or data signals. The preferred embodiment also includes a multiplexer having inputs for receiving command signals from the second read-only memory circuit and data signals from the computer bus interface and an output coupled to the controller for selectively applying either command signals from the second read-only memory circuit or data signals from the computer bus interface to the controller under the control of the command decoder.

In the preferred embodiment, the second read-only memory circuit is programmed to provide jump address commands which are applied to the binary counter to operate the first and second read-only memory circuits to implement looping programs. Sampling means may be provided for sampling the response of the controller to the discrete controls, commands and data signals to condition the binary counter to respond to the jump address commands from the second read-only memory circuit. In addition, a temporary storage register may be provided which is operable under the control of the command decoder for receiving and storing data signals for transmission between the controller and the computer bus interface. Preferably, the sampling means is also responsive to the computer bus interface to initiate transmission of data from the temporary storage register to the computer bus interface.

The invention provides a novel emulation interface which can be combined with a conventional controller, e.g., a floppy disk or other controller, to achieve a system which allows control code signals or commands in a fixed code format to be readily converted into a different code format required for use for recordation in a standard memory device, e.g., a floppy disk storage unit. The emulation interface can be used for matching control code signals and data signals between a computer bus interface and a controller, or between two separate controllers, which employ different control code formats. The interface effectively emulates commands for the controller in the required code format.

The foregoing and other objects, features and advantages of the invention will be apparent from the following more particular description of the preferred embodiment as illustrated in the accompanying drawing.

BRIEF DESCRIPTION OF THE FIGURE

The accompanying drawing is a schematic block diagram of a preferred embodiment of the emulation interface for matching control code signals and data signals between a computer bus interface and a controller.

DETAILED DESCRIPTION OF THE INVENTION

Referring to the drawing, the invention is embodied in an emulation interface, generally 10, which matches control code signals and data signals between a computer bus interface 12 and a controller 14. Interface 12 receives the control code signals and data signals via a systems bus. Controller 14 is slaved to the emulation interface and, as explained in more detail below, receives commands via a bidirectional bus and discrete control lines. The controller communicates with a conventional memory unit, e.g., a floppy disk memory unit (not shown), over a bidirectional bus 16.

In the preferred embodiment, the floppy disk memory unit may be a floppy disk drive manufactured by Shugart, model No. SA-900. The controller is preferably a floppy disk controller manufactured by Western Digital, model No. 1771.

For purposes of illustration, the emulation interface is disclosed for use with a four-bit control code which is to be converted into an eight-bit control code format. However, it will be understood that other code formats are within the scope of the invention.

A four-bit control code signal derived from computer bus interface 12 is applied via a conductor 18 to a control register 20, e.g., a standard IC chip, model No. 74175, manufactured by Texas Instruments. The computer bus interface also applies a load signal to control register 20 via a conductor 22 to command the control register to enter the four-bit control code signal on conductor 18. Conventional eight-bit data signals are transmitted between computer bus interface 12 and controller 14 via a pair of data lines 24 and 26.

The four-bit control code signal loaded into control register 20 provides address signals which are applied via a conductor 28 to the most significant binary inputs of a first, control read-only memory (ROM) circuit 30 and via a conductor 32 to the most significant binary inputs of a second, jump address read-only memory (ROM) circuit 34. In the preferred embodiment, the control ROM and jump address ROM comprise monolithic memory circuits, e.g., a conventional IC chip, model No. 6305, manufactured by Monolithic Memories. The ROM circuits are preferably programmable to provide the necessary conversion from the four-bit control code format of the computer bus interface to the eight-bit control code format of the controller.

The emulation interface includes clock means initiated by the computer bus interface upon loading of the control code signals into the control register for operating the first and second read-only memory circuits. In the preferred embodiment, control ROM 30 and jump address ROM 34 are clocked via a binary counter 36, e.g., a conventional IC chip, model No. 74163, manufactured by Texas Instruments. The output of binary counter 36 is coupled via a conductor 38 to the least significant binary inputs of control ROM 30 and jump address ROM 34.

The binary counter operation is initiated by a start signal from computer bus interface 12 via a conductor 40 connected to the binary counter input. Normally, the binary counter indexes control ROM 30 and jump address ROM 34 through the coded address areas determined by the address signals from control register 20. Control ROM 30 is programmed to provide one or more eight-bit control code signals which correspond to the four-bit control code signals stored in control register 20 and represent discrete controls for controller 14. Jump address ROM 34 is similarly programmed to convert the four-bit control code signals in control register 20 into one or more eight-bit commands in the control code format of the controller. In addition, jump address ROM 34 may include internal jump address commands, explained in more detail below, which may be used to implement looping programs.

The emulation interface includes decoder means responsive to the discrete control signals of the first read-only memory circuit for applying discrete controls to the controller. In the preferred embodiment, the output of control ROM 30 is connected via a conductor 42 to a command decoder 44 which converts the discrete control signals of the control ROM into the control code format of controller 14. The command decoder provides discrete controls, e.g., read, write or address controls, to define functions and registers in the controller to be operated. These discrete controls are applied via one or more control lines 45 to controller 14 to condition the internal registers of the controller to receive eight-bit commands or data signals on a bidirectional bus 46.

The emulation interface of the preferred embodiment also includes means operable by the command decoder for selectively applying either commands from the second read-only memory circuit or data signals from the computer bus interface to the controller. In the preferred embodiment, the output of jump address ROM 34 is coupled via a conductor 48 to a first input of a multiplexer 50, e.g., a conventional IC chip, model 74 LS 253, manufactured by Texas Instruments. A second input of multiplexer 50 is connected to data input line 24 from computer bus interface 12. A third input of the multiplexer is connected to a line 52 explained in more detail below. The multiplexer output is connected to bidirectional bus 46. Command decoder 44 provides a control signal for multiplexer 50 via a conductor 54 to select which of the multiplexer inputs is applied at its output.

The eight-bit control code signals generated by jump address ROM 34 are transmitted via multiplexer 50 and bidirectional bus 46 to controller 14. If jump address ROM 34 produces an internal jump address command, this command is applied via a conductor 56 to binary counter 36. The binary counter jumps to the designated address if it is properly conditioned by controller 14.

In the preferred embodiment, sampling means is embodied as an N-to-1 multiplexer 58 having a series of inputs coupled via a plurality of lines 60 to a set of controller outputs to sample the controller response. The output of multiplexer 58 provides a counter load signal via a conductor 62 to binary counter 36 if the controller produces a correct response. Control ROM 30 provides a signal via a conductor 64 to multiplexer 58 to select the desired controller output to be sampled.

The N-to-1 multiplexer is also responsive to computer bus interface 12 via an input line 65. This input line is activated when data is to be transferred from controller 14 to the computer bus interface. A signal appearing on line 65 indicates that the computer system is ready to receive data from controller 14. The actual operation is explained in more detail below.

By virtue of the feedback connections to binary counter 36 from jump address ROM 34 and multiplexer 58, the emulation interface is able to implement looping programs without the necessity of additional storage capacity in control ROM 30 and jump address ROM 34. Consequently, the code conversion circuit is reduced in complexity.

In the preferred embodiment of the emulation interface, a temporary storage register 66 is coupled via a conductor 68 to the output of multiplexer 50 and bidirectional bus 46 to receive and store data signals from computer bus interface 12 and controller 14. Its output is coupled to data output line 26 and via conductor 52 to the third input of multiplexer 50. Temporary storage register 66 initially receives data from computer bus interface 12 prior to the transfer of the data to controller 14. The temporary storage register also receives data from the controller for transmission over data output line 26 to computer bus interface 12. Command decoder 44 provides a latch command via a conductor 70 to instruct the temporary storage register to store the data.

In the transmission of data from computer bus interface 12 to controller 14, data signals derived from the computer bus interface are applied via data input line 24 to the second input of multiplexer 50. When command decoder 44 operates multiplexer 50 to pass the data signals at its second input, the data signals are applied via conductor 68 to temporary storage register 66. A latch command on conductor 70 from the command decoder instructs the temporary storage register to record the data signals. When controller 14 indicates via controller outputs 60 its readiness to receive data, N-to-1 multiplexer 58 provides an appropriate counter load signal via conductor 62 to actuate binary counter 36 which operates control ROM 30 to jump to the appropriate address to command the controller to receive data. The command signals generated by controller ROM 30 are applied via conductor 42 to command decoder 44 which applies discrete controls via control lines 45 to enable the controller to read the data. The command decoder also operates multiplexer 50 via conductor 54 to pass the recorded data signals on line 52 from the output of temporary storage register 66 to controller 14 via bidirectional bus 46.

When data is to be transferred from controller 14 to computer bus interface 12, the controller is initially activated by discrete controls on lines 45 from command decoder 44 to transmit data signals via bidirectional bus 46 and conductor 68 to temporary storage register 66. The command decoder also generates a latch command on conductor 70 to instruct the temporary storage register to record the data signals from the controller. When the computer bus interface applies an input signal via conductor 65 to N-to-1 multiplexer 58 indicating readiness of the system to receive the data, the multiplexer provides an appropriate counter load signal via conductor 62 to operate binary counter 36 which activates control ROM 30 to provide the necessary commands to command decoder 44. The command decoder generates a data load signal on a conductor 80 which instructs computer bus interface 12 to load the data signals from temporary storage register 66 via data output line 26.

The emulation interface of the present invention achieves the necessary code conversion between data processing units which employ different control code formats with a minimum of circuit components. The relatively uncomplicated circuitry of the emulation interface is inexpensive to manufacture. Moreover, the circuitry allows looping programs to be implemented to minimize the number of circuit components required.

The present invention is not limited to the specific details shown and described, and modifications may be made in the emulation interface without departing from the principles of the invention.

What is claimed is:

1. An interface system for matching control code signals and data signals between a data processing unit and a controller which employ different control code formats, comprising:
   a control register for receiving control code signals from the data processing unit and having an input and an output;
   a first read-only memory circuit responsive to the output of said control register and programmed to provide discrete control signals corresponding to the control code signals in said control register;
   a second read-only memory circuit responsive to the output of said control register and programmed to convert the control code signals in said control register into corresponding commands in the control code format of the controller;
   clock means initiated upon loading of the control code signals into said control register for operating said first and second read-only memory circuits;
   decoder means responsive to the discrete control signals of said first read-only memory circuit for applying discrete controls to the controller to condition its registers to receive commands or data signals and for generating a select signal; and
   means responsive to said select signal generated by said decoder means for selectively applying either commands from said second read-only memory circuit or data signals from the data processing unit to the controller.

2. The interface system of claim 1, wherein:
said second read-only memory circuit is programmed to provide jump address commands to implement looping programs.

3. The interface system of claim 2, which includes:
means for sampling the response of the controller to condition said clock means to respond to the jump address commands from the second read-only memory circuit.

4. The interface system of claim 1, which includes:
a temporary storage register operable under the control of said decoder means for receiving and storing data signals from the data processing unit for transmission to the controller.

5. The interface system of claim 4, wherein:
said temporary storage register is also operable under the control of said decoder means to receive and store data signals from the controller for transmission to the data processing unit.

6. An emulation interface for matching control code signals and data signals between a computer bus interface and a controller which employ different, fixed control code formats, comprising:
- a control register for receiving control code signals from the computer bus interface and having an input and an output;
- a first read-only memory circuit having its most significant binary inputs responsive to the output of said control register and programmed to provide discrete control signals corresponding to the control code signals from the computer bus interface;
- a second read-only memory circuit having its most significant binary inputs responsive to the output of said control register and programmed to convert the control code signals of the computer bus interface into corresponding commands in the control code format of the controller;
- a binary counter initiated by the computer bus interface upon loading of the control code signals into said control register, said binary counter having its output coupled to the least significant binary inputs of said first and second read-only memory circuits for indexing said first and second read-only memory circuits;
- a command decoder responsive to the output of said first read-only memory circuit for converting its discrete control signals into the control code format of the controller and applying discrete controls to the controller to condition its registers to receive commands or data signals, and for generating a select signal; and
- a multiplexer having first inputs for receiving command signals from said second read-only memory circuit and data signals from the computer bus interface, a second input for receiving a signal from said command decoder, and an output coupled to the controller for selectively applying either commands from said second read-only memory circuit or data signals from the computer bus interface to the controller under the control of said select signal generated by said command decoder.

7. The emulation interface of claim 6 wherein:
said second read-only memory circuit is programmed to provide jump address commands which are applied to said binary counter to operate said first and second read-only memory circuits to implement looping programs.

8. The emulation interface of claim 7, which includes:
means for sampling the response of the controller to the discrete controls, commands and data signals to condition said binary counter to respond to the jump address commands from said second read-only memory circuit.

9. The emulation interface of claim 6, which includes:
a temporary storage register operable under the control of said command decoder for receiving and storing data signals from the computer bus interface for transmission to the controller.

10. The emulation interface of claim 9, wherein:
said temporary register is also operable under the control of said command decoder to receive and store data signals from the controller for transmission to the computer bus interface.

* * * * *